(12) United States Patent
Oshida et al.

(10) Patent No.: US 8,197,059 B2
(45) Date of Patent: Jun. 12, 2012

(54) MEDIA PROCESSOR

(75) Inventors: Kazuya Oshida, Hara-mura (JP);
Hideki Kawakami, Hata-machi (JP);
Kenichiro Arai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1267 days.

(21) Appl. No.: 11/877,030

(22) Filed: Oct. 23, 2007

(65) Prior Publication Data

US 2008/0094987 A1    Apr. 24, 2008

(30) Foreign Application Priority Data

Oct. 23, 2006    (JP) ................................ P2006-288138

(51) Int. Cl.
*B41J 29/13*    (2006.01)
*B41J 2/01*    (2006.01)
(52) U.S. Cl. ......................... 347/108; 347/101; 347/104
(58) Field of Classification Search .................. 347/1, 2, 347/101, 104–108
See application file for complete search history.

(56) References Cited

U.S. PATENT DOCUMENTS

| | | | |
|---|---|---|---|
| 5,461,408 A * | 10/1995 | Giles et al. .................... | 347/102 |
| 5,734,629 A | 3/1998 | Lee et al. | |
| 6,390,618 B1 | 5/2002 | Wotton et al. | |
| 6,400,659 B1 | 6/2002 | Kitaoka | |
| D602,520 S | 10/2009 | Kimura et al. | |
| 7,843,785 B2 | 11/2010 | Nishioka et al. | |
| 7,857,574 B2 | 12/2010 | Kawasaki et al. | |
| 7,882,272 B2 | 2/2011 | Ichikawa et al. | |
| 7,889,611 B2 * | 2/2011 | Nishioka et al. ........... | 369/53.15 |
| 2007/0203946 A1 | 8/2007 | Maeshima et al. | |
| 2008/0043074 A1 | 2/2008 | Hagiwara et al. | |
| 2008/0094987 A1 | 4/2008 | Oshida et al. | |
| 2008/0105142 A1 | 5/2008 | Ichikawa et al. | |
| 2008/0250436 A1 | 10/2008 | Kawakami | |
| 2008/0273433 A1 | 11/2008 | Nishioka et al. | |
| 2008/0316874 A1 | 12/2008 | Kawakami | |
| 2009/0028010 A1 | 1/2009 | Nishioka et al. | |

FOREIGN PATENT DOCUMENTS

| | | |
|---|---|---|
| JP | 62-37976 | 3/1987 |
| JP | 2000-229423 A | 8/2000 |
| JP | 2000-260172 | 9/2000 |

(Continued)

OTHER PUBLICATIONS http://www.bbtus.com/bbtjp/hardware/primera.html, web site pages, printed out on Oct. 19, 2007 (origination date unknown), 7 pp.

(Continued)

*Primary Examiner* — Geoffrey Mruk

(57) ABSTRACT

A media storage is adapted to store a plate-shaped medium. A media drive is operable to write data in the medium. A label printer is operable to print on the medium. A media conveyer is operable to convey the medium between the media storage, the media drive and the label printer. A casing defines an interior space of the media processor. A plate-shaped frame divides the interior space into a first space located in a rear upper portion of the interior space, a second space located in a rear lower portion of the interior space and a front space located in a front portion of the interior space. The media drive is disposed in the first space. The label printer is disposed in the second space. The media storage and the media conveyer are disposed in the front space.

7 Claims, 9 Drawing Sheets

FOREIGN PATENT DOCUMENTS

| | | |
|---|---|---|
| JP | 2002-237104 | 8/2002 |
| JP | 2004-79095 | 3/2004 |
| JP | 2005-129669 | 5/2005 |
| JP | 2005-251325 A | 9/2005 |
| JP | 2006-341572 A | 12/2006 |
| JP | 2007-160621 A | 6/2007 |
| JP | 2007-305273 A | 11/2007 |
| WO | WO 2006/104066 | 10/2006 |
| WO | WO 2006/104066 A1 * | 10/2006 |

OTHER PUBLICATIONS http://www.tsc.teac.co.jp/02products/sys/wp45b/index.html, web site page, printed out on Oct. 19, 2007 (origination date unknown), 1 pg.

http://www.primera.com/bravoxr¯series.html, web site page, printed out on Jul. 6, 2007 (origination date unknown), 1 pg.

Epson PP-100 User's Guide, Copyright 2008 Seiko Epson Corporation, excerpt PP100userguide¯excerpt.

* cited by examiner

MEDIA PROCESSOR

The disclosure of Japanese Patent Application No. 2006-288138 fled on Oct. 23, 2006 including specification, drawings and claims is incorporated herein by reference in its entirety.

BACKGROUND

The present invention relates to a media processor capable of providing desired media by writing data on media such as CDs and DVDs and by conducting printing on label faces of the media.

Conventional media processors, which write data on plate-shaped media such as CDs and DVDs and conduct label-printing, are utilized by supplying blank media accommodated in a blank media stacker to a media drive incorporated into the media processor and predetermined data is written on the media. Subsequently, label-printing is conducted on the media by a label-printer. Then, the media are stored in a media stacker or are taken out from the media processor.

The above media processor includes a case into which the media drive or the label-printer for conducting label-printing are incorporated so that the equipment arranged inside the media processor can be protected from vibration and dust from the outside. Examples of such a media processor are described in Non-patent Documents 1 and 2.

Non-Patent Document 1
Home pages for introducing products of PRIMERA
(http://www.bbtus.com//bbtjp/hardware/primera.html)
Non-Patent Document 2
Home pages for introducing products of TEAC
(http://www.tsc.teac.co.jp/02products/sys/wp45b/index.html)

When the media processor is used, various maintenance operations must be conducted. For example, when blank media are supplied from the blank media stacker to the media drive and data is written on the blank media or printing is conducted on label-faces of the media by the label printer, it is necessary to replenish the blank media stacker with new blank media. Further, in the case where ink has been consumed for label-printing, it is necessary to replace ink cartridges with new ones. The above maintenance operations must be conducted according to the user's own frequency of using the media processor. On the other hand, it is impossible for the user to conduct the inspection for preventing processor trouble, and it is also impossible for the user to repair the processor trouble. Therefore, it is necessary to ask a professional service man to do the work. In general, such maintenance is not frequently conducted. Accordingly, the user would like to avoid the troublesome process of moving the media processor or removing the case from the media processor. Even in the case where the service man conducts the maintenance operations, it is desirable to avoid a complicated operation such as an overhaul of the entire media processor.

SUMMARY

It is therefore an object of the described embodiments to provide a media processor where maintenance operations are easy.

In order to achieve the above objects, according to an aspect of the described embodiments, there is provided a media processor comprising: a media storage adapted to store a plate-shaped medium; a media drive operable to write data in the medium; a label printer operable to print on the medium; a media conveyer operable to convey the medium between the media storage, the media drive and the label printer; a casing defining an interior space of the media processor; and a plate-shaped frame dividing the interior space into a first space located in a rear upper portion of the interior space, a second space located in a rear lower portion of the interior space and a front space located in a front portion of the interior space, wherein: the media drive is disposed in the first space; the label printer is disposed in the second space; and the media storage and the media conveyer are disposed in the front space.

With the above configuration, the interior space of the media processor is divided into a plurality of spaces. Therefore, when maintenance operations are conducted on any equipment incorporated into the media processor, a space in which the equipment is disposed is opened so that the equipment can be repaired or replaced. Since maintenance operations on the media drive and the label printer should be conducted by a professional service man (professional maintenance), the media drive and the label printer are disposed at the rear of the media processor. Since maintenance operations on the media storage portion can be performed by a user (user maintenance, the media storage portion is disposed in the front of the media processor. Accordingly, user maintenance, such as replacement of the media, can be easily conducted from the front side of the processor. That is, only when less frequent professional maintenance operations are needed, maintenance may be conducted from the rear side of the processor. Therefore, the maintenance properties of the entire media processor are improved.

Trouble with the media drive tends to occur in the media processor. Since the media drive is disposed in the rear upper space of the media processor, professional maintenance can be easily conducted. In this context, a part of the casing in the rear face of the processor is detached, and the rear face of the processor is opened; or a part of the casing on the rear face of the processor and a part of the casing on the upper face of the processor are detached, and a rear face and an upper face of the processor are opened. In this state, the media drive can be easily replaced.

Further, since the printer which is more complicated and delicate than the media drive is disposed in another space, even when maintenance operations are conducted on the media drive, the printer is seldom affected.

As described above, when maintenance operations are conducted, it is necessary to pay attention to the other device components from the viewpoint of delicacy, precision and accuracy so that the other components will not be affected. Since the media processor is divided into a plurality of spaces for corresponding components, even when maintenance operations are conducted in one of the spaces, the components disposed in the other spaces are not affected.

The media processor may further comprise an ink supplier operable to supply ink to the label printer. The front space may be divided into a third space and a fourth space adjacent the third space. The media storage and the media conveyer may be disposed in the third space. The ink supplier may be disposed in the fourth space. Further, the casing may include a first door for the third space and a second door for the fourth space.

With the above configuration, the ink supplier and the media storage are disposed in different spaces in the front of the media processor. Therefore, the media processor can be maintained without affecting the ink supplier by the user maintenance operations such as replacement of media. Further, since the doors are respectively provided for the third space and the fourth space, the maintenance operations can be independently conducted for each component. When the second door for the ink supplier is opened, the ink cartridge can be easily replaced. When the first door for the media storage is opened, the blank media can be easily replenished, and the finished media can be easily taken out.

The media processor may further comprise a power supply unit; and a fan operable to take outside air into the interior space. The power supply unit and the fan may be disposed in the first space.

With the above configuration, the media drive and the power supply unit, from which heat is generated, are disposed in the same space, and the fan takes countermeasures against the generated heat. Therefore, the processor can be effectively cooled by the fan. Further, the first space is located in an upper portion of the processor. Accordingly, since it is difficult for high temperature air to flow downward, a high cooling efficiency can be obtained. In the described embodiments, the label printer, which is disposed in the second space lower than the first space, can be seldom affected by heat. In the case of an ink jet printer in which dogging of ink tends to occur due to dryness, the above arrangement of components can provide an advantageous effect. Further, the power supply unit and the fan are disposed in the same space as the media drive, the installation space of which is smaller than that of the label printer. Therefore, the interior space of the media processor can be effectively utilized, and the entire media processor can be downsized.

At least one of a rear face and an upper face of the casing may be independently removable so that the first space is opened.

With the above configuration, the rear face or the upper face of the casing can be independently removed. Therefore, in the case of maintaining the media drive disposed in the rear upper portion, the first space can be opened, and the media drive can be exposed by removing at least one of the rear face and the upper face of the casing. Therefore, at the time of maintaining the media drive, the number of parts to be removed can be reduced, and the maintenance property can be enhanced.

The plate-shaped frame may be formed with an opening communicating between the first space and the second space, and the opening may be closed by a cover.

With the above configuration, when the label-printer, which is disposed in the space in the rear lower portion of the media processor, is maintained, it is unnecessary to remove a plate-shaped frame defining the boundary between the rear upper space and the rear lower space. By removing only the cover closing the opening communicating between the rear upper space and the rear lower space, it is possible to have access to the rear lower space from the rear upper space.

In another exemplary aspect, a media processor for processing a plate-shaped medium, such processing including medium storage, data writing and label printing, comprises a casing defining an interior space of the media processor and housing media processor components for performing the processing, the interior space being divided into a first professional maintenance access portion, a second professional maintenance access portion, and a user maintenance access portion, wherein the media processor components for data writing and label printing are disposed in the first professional maintenance access portion and the second professional maintenance access portion, respectively, and wherein the media processing components for medium storage are disposed in the user maintenance access portion. The media processor may additionally include an ink supply mechanism that supplies ink to the media processor component for label printing, where the ink supply mechanism is disposed in the user access maintenance portion.

BRIEF DESCRIPTION OF THE DRAWINGS

The above objects and advantages will become more apparent by describing in detail preferred exemplary embodiments thereof with reference to the accompanying drawings, wherein.

DETAILED DESCRIPTION OF THE EMBODIMENTS

Figure 1:
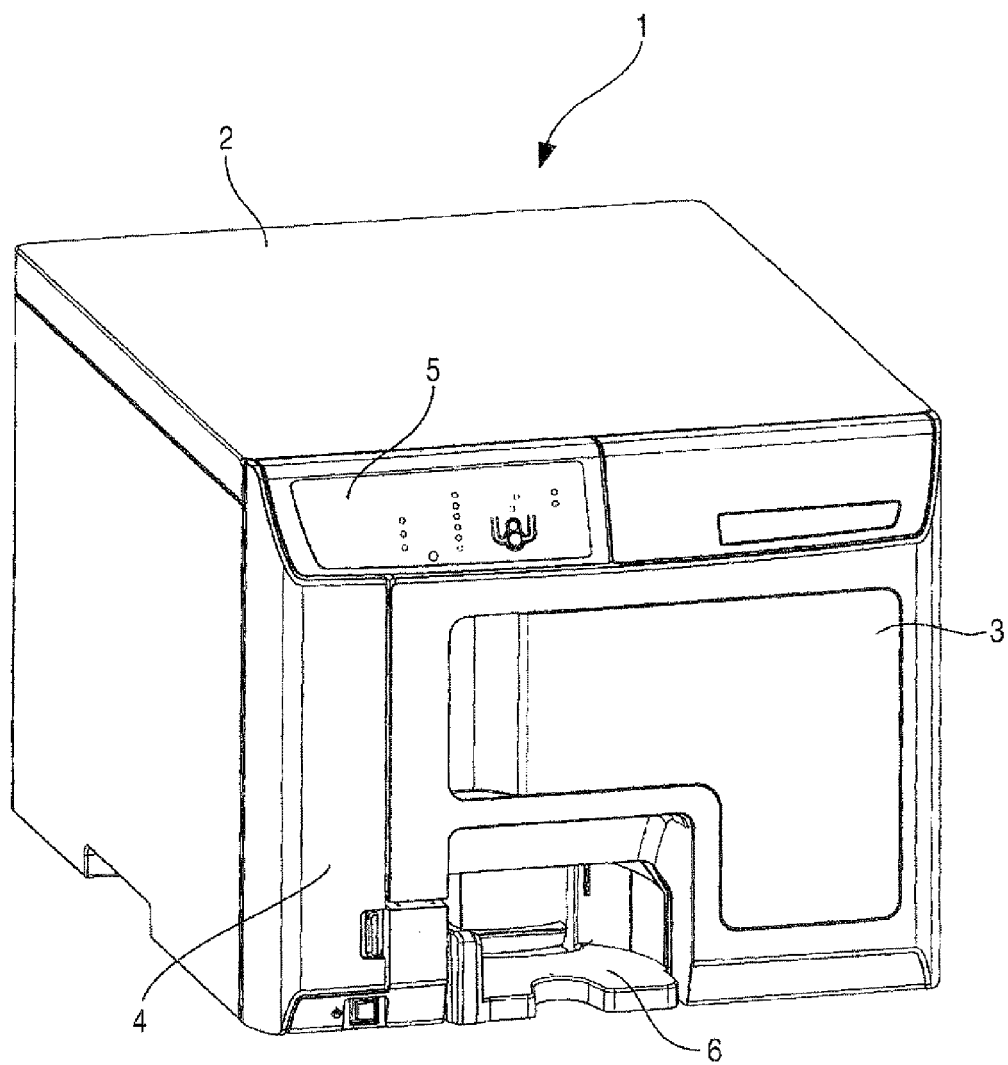
FIG. 1 is a perspective view showing an external appearance of an embodiment of a media processor.

Hereinafter, an embodiment of the media processor will be described in detail with reference to the drawings.

First, an overall arrangement of the media processor of the present embodiment will be described.

As shown in FIGS. 1 to 4, the media processor 1 is a media processor (disk publisher) for writing data onto media such as CDs and DVDs and for conducting printing on label-faces of the media. The media processor 1 includes a case 2, the shape of which is a substantially rectangular parallelepiped. Opening and closing doors 3, 4, which can be opened and closed to the right and left, are attached to a front side of the case 2. In a front face upper side right end portion of the case 2, an operation panel 5, on which indicating lamps and operation buttons are arranged, is provided. A media discharge port 6 is provided at a lower end portion of the case 2. The opening and closing door 3 has a transparent window portion, through which the inside of the media processor can be viewed from the outside. An upper face, both sides and a rear face of the case 2 are respectively independent from one another. Therefore, the upper face, both sides and the rear face can be individually attached to and detached from the case 2.

The opening and closing door 3 arranged on the right in the front view (on the left of the media processor) is opened and closed when blank media MA which have not been used yet, are set or when media MB which have already been finished, are taken out.

The opening and closing door 4 arranged on the left in the front view (on the right of the media processor) is opened and closed when an ink cartridge 12 of the label printer 11 is replaced. When this opening and closing door 4 is opened, a cartridge attaching portion 14 (shown in FIG. 6) having a plurality of cartridge holders 13 arranged in the perpendicular direction is exposed. The cartridge attaching portion 14 is a portion of an ink supply mechanism 71 for supplying ink into an ink jet head 61 (shown in FIG. 8) of the label-printer 11.

Figure 2A:
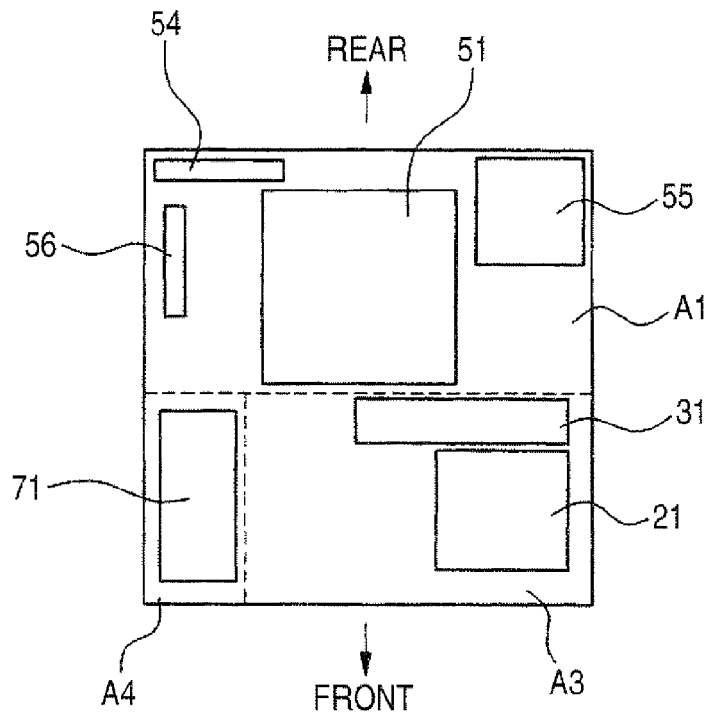
FIG. 2(A) is a schematic plan view showing a division of an upper half of the media processor.
Figure 2B:
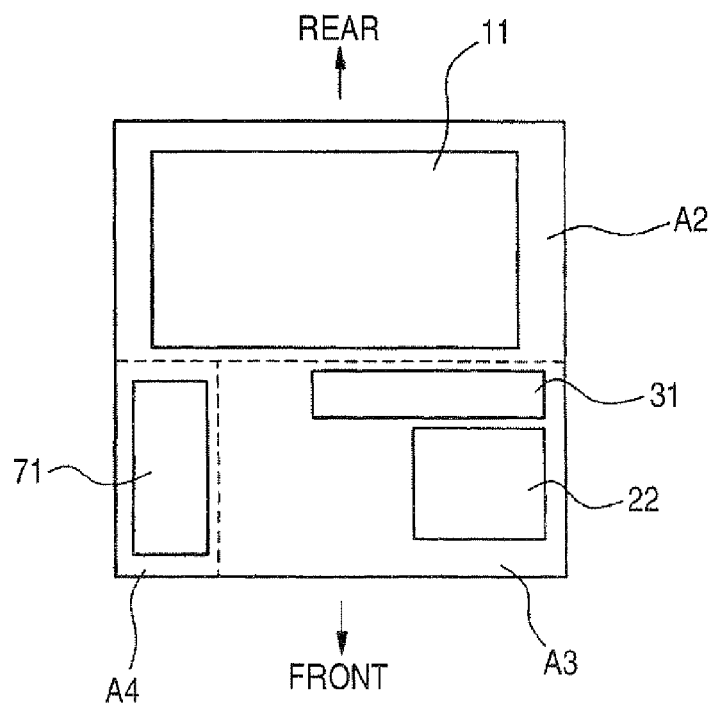
FIG. 2(B) is a schematic plan view showing a division of a lower half of the media processor.
Figure 5:
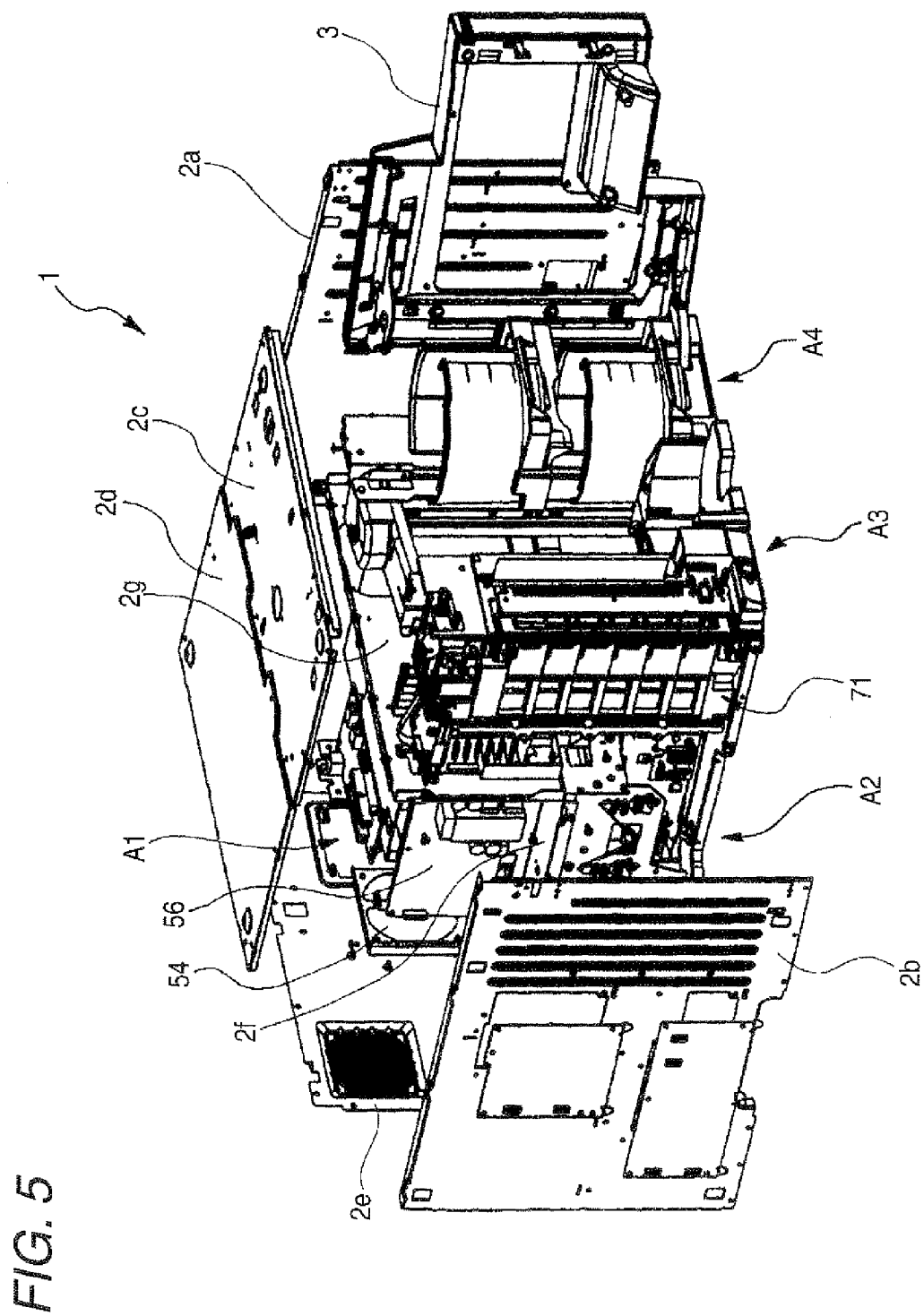
FIG. 5 is a perspective view showing a state in which each frame is removed.

As shown in FIGS. 2(A) and 2(B), the inside of the media processor 1 is covered with a plurality of plate-shaped frames (as also shown in FIG. 5). In this case, the plurality of plate-shaped frames include a base frame 72 (FIG. 6), a left side frame 2a, a right side frame 2b, a front top frame 2c, a rear top frame 2d, a back frame 2e, a rear upper, lower partitioning frame 2f, and a front, rear partitioning frame 2g. The inside of the media processor 1 is roughly divided into a first division A1 in the rear upper portion, a second division A2 in the rear lower portion, a third division A3 in the front right portion, and a fourth division A4 in the front left portion. In the first division A1 in the rear upper portion, the media drive 51 for writing data onto media is arranged. In the second division A2 in the rear lower portion, the label printer 11 for conducting printing on the label faces of the media is arranged. In the fourth division A4 of the front left portion, the ink supply mechanism 71 having the cartridge attaching portion 14 is arranged. In the third division A3 of the front right portion, the media storage portions 21, 22 for storing the media are arranged.

Figure 3:
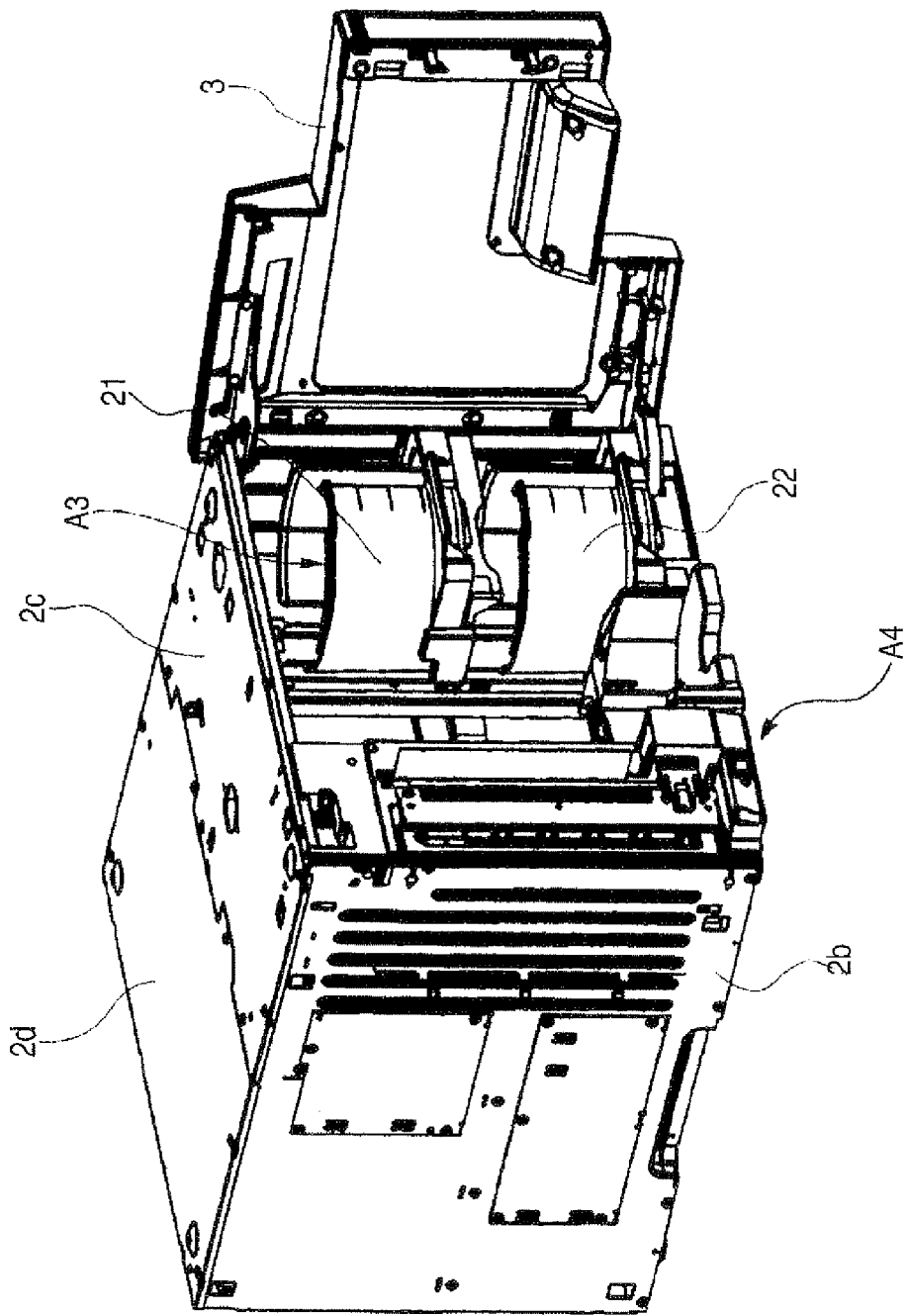
FIG. 3 is a front perspective view showing a state in which a case is removed from the media processor, and an opening and closing door is opened.
Figure 4:
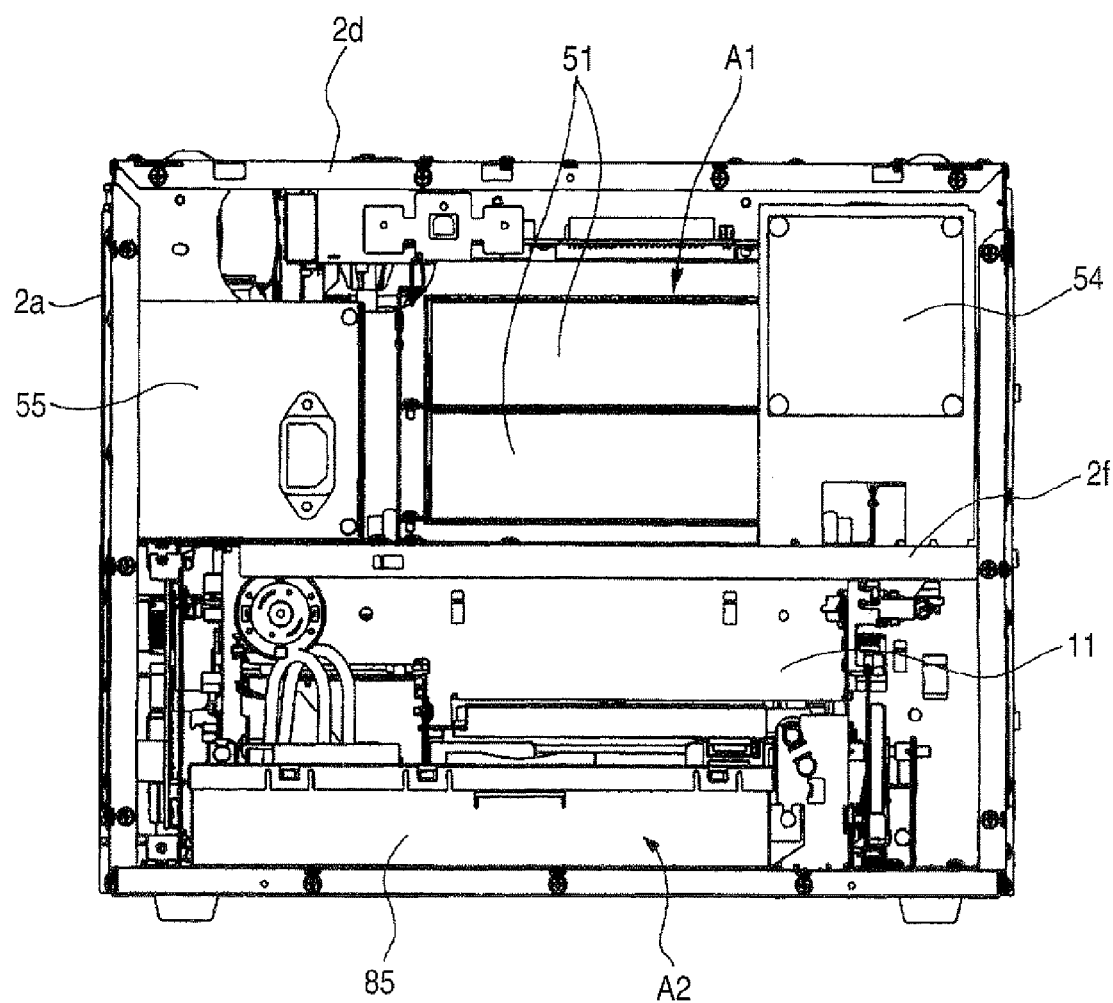
FIG. 4 is a rear view showing the media processor, the rear face frame of which is removed.

As shown in FIG. 3, inside the case 2 of the media processor 1, a blank media storage portion 21, which is a media stacker capable of stacking a plurality of blank media MA which have not been used yet, and a finished media storage portion 22, which is a media stacker for storing finished media MB, are coaxially arranged in the vertical direction in the third division A3.

The blank media storage portion 21 includes a pair of right and left arcuate frame plates 24, 25. By these arcuate frame plates 24, 25 forming a stacker, blank media MA are received from above and stacked on one another in the axial direction. When the opening and closing door 3 is opened and the stacker is taken out, the blank media MA can be easily accommodated or supplemented to the blank media storage portion 21.

The finished media storage portion 22, which is arranged on the lower side, is composed in the same manner as that of the blank media storage portion 21. The finished media storage portion 22 includes a pair of right and left arcuate frame plates 27, 28 forming a stacker. The finished media MB are received from above and are stacked on one another in the axial direction.

In the case where media are discharged into a media discharge port 6, the finished media MB, on which data has been written and label face printing has been finished, that is accommodated in the finished media storage portion 22 can be easily taken out under the condition that the opening and closing door 3 is kept closed.

In this instance, the media stacker of the finished media storage portion 22 can be used as a blank media storage portion. In this case, the finished media may be discharged into the media discharge port 6.

As described above, the media storage portions 21, 22 are portions on which a user conducts the maintenance operations. For example, according to a state of use of the media, the blank media MA are supplemented into the storage portions, or the finished media MB are taken out from the storage portions by the user. This maintenance can be easily conducted when the opening and closing door 3 on the front face of the media processor is opened.

Figure 6:
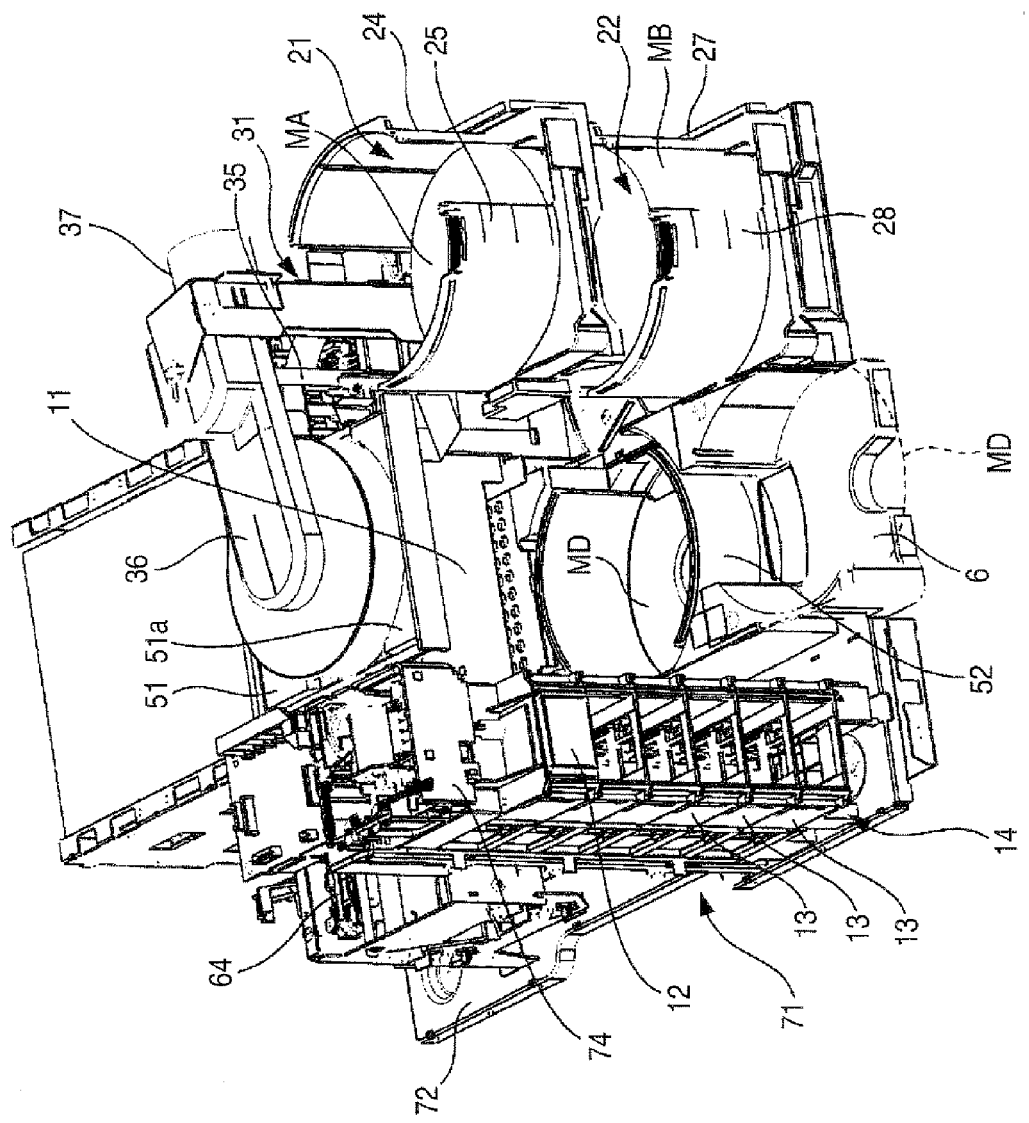
FIG. 6 is a front perspective view of the media processor, the case and the frame of which are removed.

With reference to FIG. 6, a stacker 52 for the media to be discarded is arranged in a lower portion of the media delivery position of the media tray 15 of the label printer 11 (described later). The media MD to be discarded and the finished media MB are temporarily stored in the stacker 52. The media to be discarded, for example, about 30 media MD to be discarded can be stored. Under the condition that the media tray 15 is withdrawn from the media delivery position in the upper portion of the stacker 52 for the media to be discarded to the printing position, that is, in the state shown in FIGS. 6 and 7, the media MD to be discarded can be supplied to the stacker 52 by a conveyance arm 36 of the media conveyance mechanism 31.

As shown in FIGS. 2(A), 2(B) and 6, an ink supply mechanism 71 is arranged on the left of the front portion inside the case 2 of the media processor 1.

The ink supply mechanism 71 supplies ink of each color to the label printer 11. In the present embodiment, ink of six colors consisting of black, cyan, magenta, yellow, light cyan and light magenta is supplied to the label printer 11. The ink supply mechanism 71 includes a cartridge attaching portion 14 into which the ink cartridge 12 is incorporated. In the cartridge attaching portion 14, a cartridge holder 13 for holding the ink cartridge 12 is laminated and vertically provided on a base frame 72 of the media processor 1. To this ink supply mechanism 71, one end of a flexible ink supply tube 73 (shown in FIG. 8) is connected. The other end of this ink supply tube 73 is connected to a carriage 62 of the label printer 11.

Ink is supplied from the ink cartridge 12 of the ink supply mechanism 71 to the carriage 62 through the ink supply tube 73. Ink is supplied to an ink jet head 61 through a damper unit and a back pressure adjustment unit (not shown) which are arranged in the carriage 62.

A pressurizing mechanism 74 is arranged in an upper portion of the ink supply mechanism 71. The pressurizing mechanism 74 gives pressure to the ink cartridge 12, so that ink can be sent out from the ink cartridge 12 into an ink pack in the ink cartridge 12.

As described above, mechanisms to be frequently maintained such as media storage portions 21, 22 and an ink supply mechanism 71 are arranged on the front side of the media processor 1. Therefore, it is possible for a user to easily and frequently supply the media to the media storage portions 21, 22, and it is possible for the user to easily and frequently replace the ink cartridge 12, in which ink for printing labels is accommodated, with a new one. That is, since the media storage portions 21, 22 are arranged in the third division A3 in the front right portion of the media processor 1 and the ink supply mechanism 71 is arranged in the fourth division A4 of the front left portion, when the opening and closing doors 3, 4 are opened, the maintenance operations can be easily conducted.

As shown in FIGS. 2(A), 2(B) and 6, a media conveyance mechanism 31 is arranged on the rear side of the blank media storage portion 21 and the finished media storage portion 22. As shown in FIG. 6, the media conveyance mechanism 31 includes: a base frame 72; a vertical guide shaft 35 vertically attached to the front top frame 2c; and a conveyance arm 36 attached to the vertical guide shaft 35. The conveyance arm 36 can be elevated along the vertical guide shaft 35 by the drive motor 37. At the same time, the conveyance arm 36 can be rotated to the right and left around the vertical guide shaft 35. On a lower face of the conveyance arm 36, a gripping mechanism (not shown) is arranged at a forward end portion. When media such as CDs are conveyed by the conveyance arm, a central hole of each medium is held by the gripping mechanism.

By the media conveyance mechanism 31, media such as CDs or DVDs are conveyed between the blank media storage portion 21, the finished media storage portion 22, the stacker 52 for media to be discarded, the media tray 51a of the media drive 51, and the media tray 15 of the label printer 11.

Figure 8:
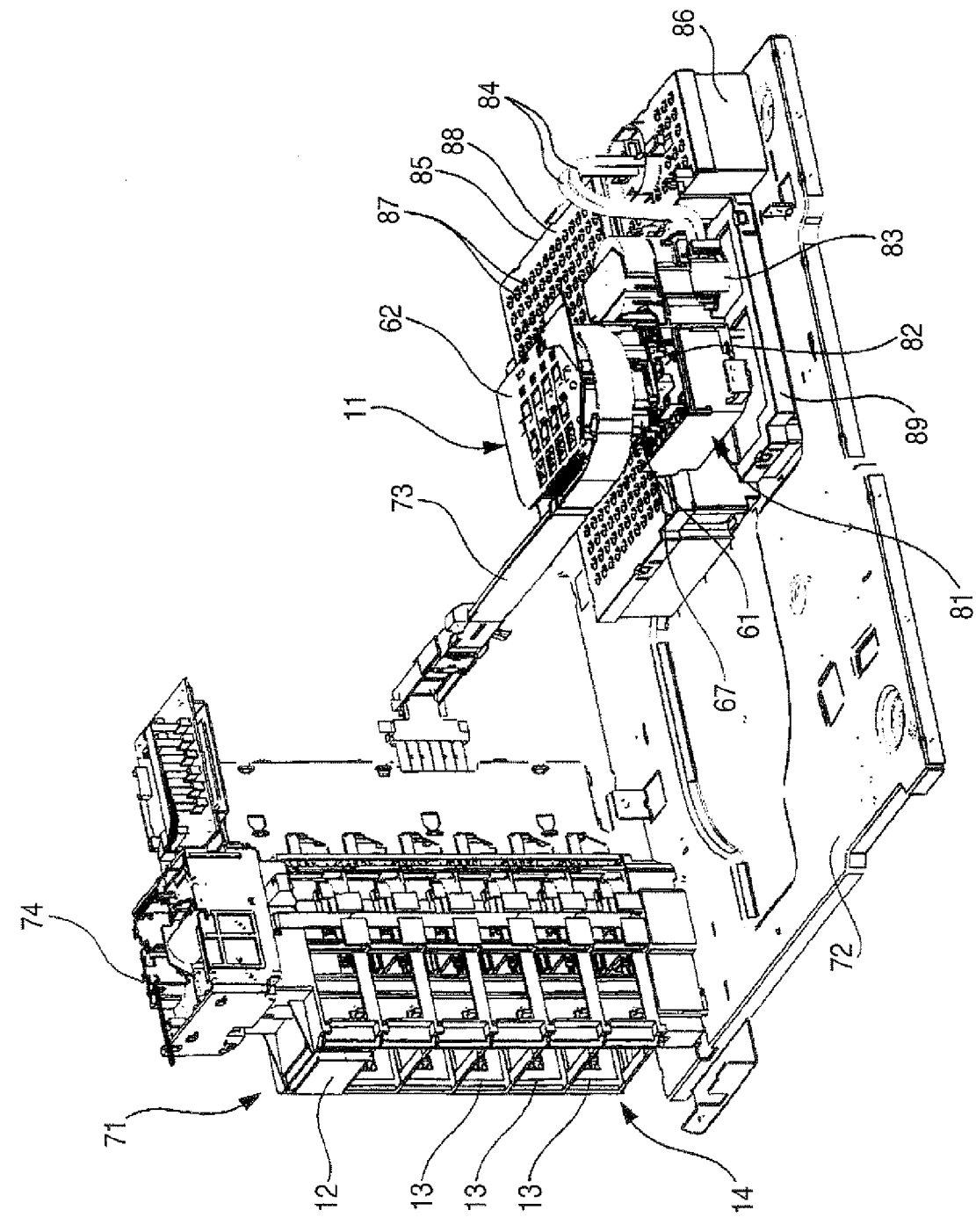
FIG. 8 is a perspective view showing a label-printer and an ink supply mechanism incorporated into the media processor.
Figure 9:
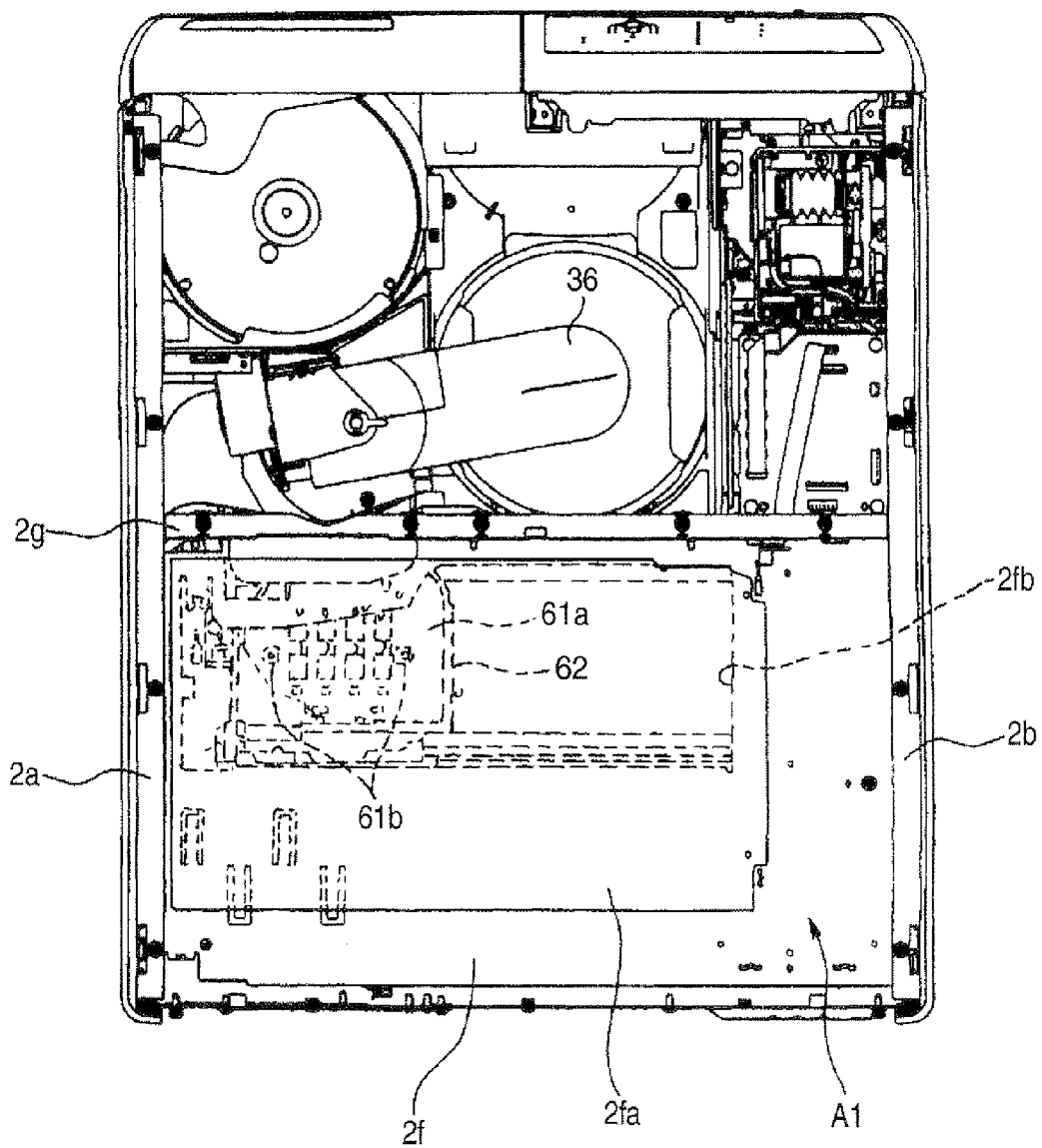
FIG. 9 is a schematic plan view for explaining the media processor from which a media drive, a cooling fan, an electric power supply portion and a control board are removed.

As shown in FIGS. 2(A), 2(B) and 8, the label printer 11 is arranged in the second division A2 of the rear lower portion of the media processor 1. Two media drives 51 which are laminated on each other in the vertical direction are arranged above the label printer 11 (the first division A1 of the rear upper portion), two media drives 51.

Figure 7:
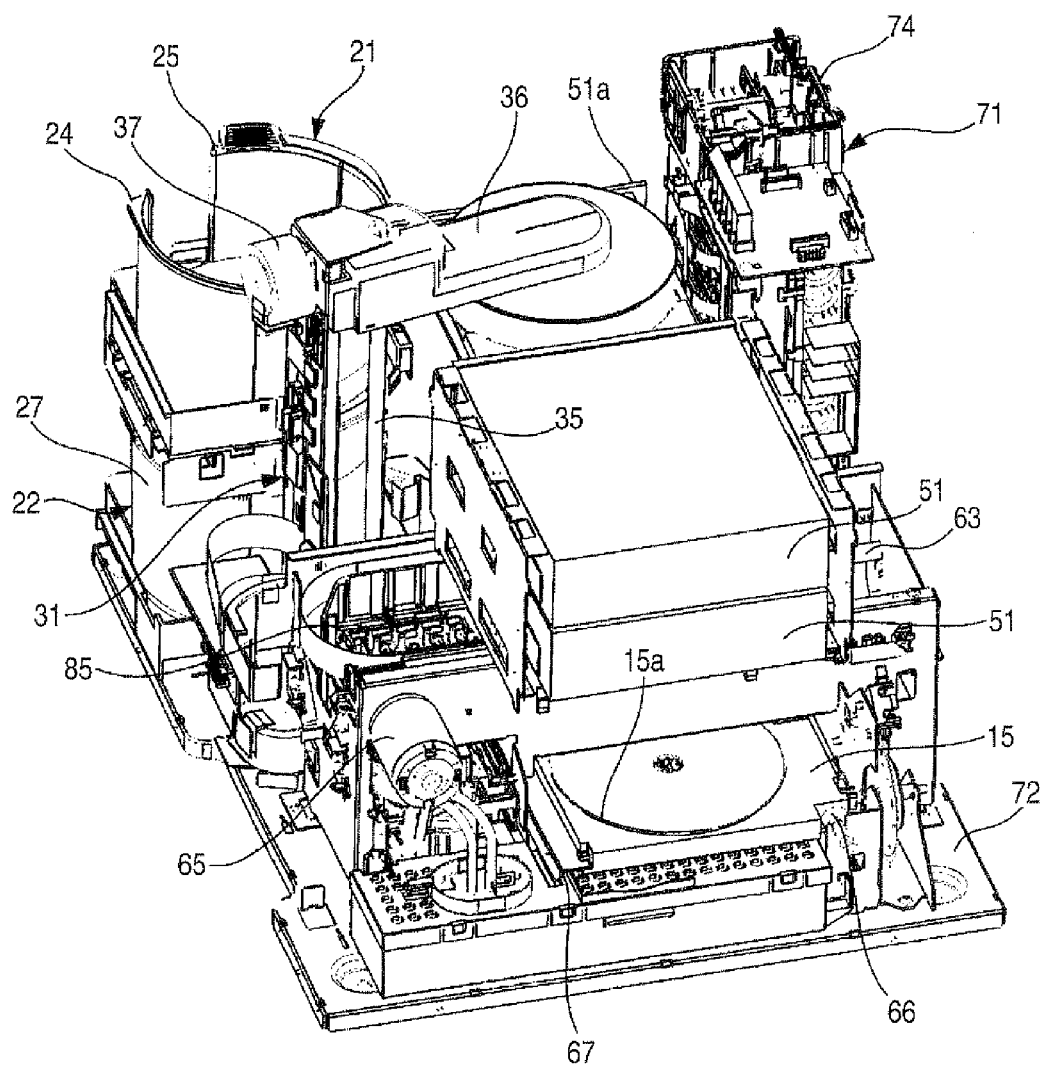
FIG. 7 is a rear perspective view of the media processor, the case and the frame of which are removed.

As shown in FIGS. 2(A), 2(B) and 7, the label printer 11, which is arranged in the second division A2 of the rear lower portion in the media processor 1, includes a media tray 15 capable of moving between a label printing position, at which label printing can be conducted on the label face of each medium, and a media delivery position at which media can be received and delivered. FIGS. 6 and 7 show a state in which the media tray 15 of the label printer 11 is located at a label printing position on the inner side. On the media tray 15, a circular low protrusion 15a is provided which regulates a movement of each medium when the circular protrusion comes into contact with an outer circumferential end face of the medium.

As shown in FIG. 8, the label printer 11 includes a carriage 62 having an ink jet head 61. The carriage 62 is supported along the carriage guide shaft 63 (shown in FIG. 7) so that the carriage 62 can be reciprocated in the horizontal direction. The carriage 62 includes: a timing belt 64 horizontally provided along the carriage guide shaft 63; and a carriage motor 65 for driving the timing belt 64.

The ink jet head 61 mounted on the carriage 62 is arranged in such a manner that the nozzle face is directed downward. At the lower side position of the ink jet head 61, the media tray 15 can be horizontally reciprocated in the longitudinal direction. A right end of the media tray 15 is supported by the guide shaft 66 horizontally extending in the longitudinal direction. A left end of the media tray 15 is slidably supported by the guide rail 67 horizontally extending in the longitudinal direction. The drive mechanism of the media tray 15 includes: a timing belt (not shown) horizontally provided in the longitudinal direction; and a tray motor for driving the timing belt.

On the lower side at the home position (shown in FIG. 8) of the carriage 62, an ink suction mechanism 81 is provided. The ink suction mechanism 81 includes: a cap 82 for covering nozzles of the ink Jet head 61 exposed on the lower face of the carriage 62 arranged at the home position; and a waste ink suction pump 83 for sucking waste ink discharged into the cap 82 by the head cleaning operation or the ink charging operation conducted by the ink jet head 62.

Waste ink sucked by the waste ink suction pump 83 of the ink suction mechanism 81 is sent into a waste ink absorption tank 85 through a tube 84. The waste ink absorption tank 85 includes absorbing material (not shown) arranged in the case 86. An upper face of the waste ink absorption tank 85 is covered with a cover 88 having a plurality of holes 87. A waste ink receiving portion 89, which is a portion of the waste ink absorption tank 85, is provided in a lower portion of the waste ink suction mechanism 81. The waste ink receiving portion 89 receives drops of waste ink dropped from the waste ink suction mechanism 81 and absorbs the waste ink with the absorbing material.

Each medium is held by the protrusion 15a of the media tray 15, and the tray motor (not shown) is driven so as to move the media tray 15 along the guide shaft 66. In this way, the media tray 15 can be moved into a printing region of the ink jet head 61. Subsequently, a predetermined printing operation can be conducted on the label face of each medium by the ink jet head 61. After printing has been completed, the media tray 15 is located at a media delivery position on the front side of the label printer 11.

The waste tank absorption tank 85 is also arranged at a lower position in the printing region of the ink jet head 61. Ink drops dripped from the ink jet head 61 are received by the waste ink absorption tank 85.

As shown in FIGS. 2(A), 2(B) and 4 to 7, media drives 51, 51, which are vertically arranged and formed into two stages, are provided in the first division A1 in the rear upper portion in the case 2 of the media processor 1. Each media drive 51 includes a media tray 51a capable of being moved between the writing position, at which data is written onto the media, and the media delivery position at which the medium is received and delivered. FIGS. 6 and 7 show a state in which the media tray 51a of the upside media drive 51 is pulled out to the operator's side and located at the media delivery position.

The frequency of maintenance of the label printer 11 and the media drive 51 is so low that preventative maintenance of inspection and any repair work are conducted by a professional service man; that is, in general, a user seldom conducts these maintenance operations. As described above, the label printer 11 is arranged in the second division A2 in the rear lower portion, and the media drive 51 is arranged in the first division A1 in the rear upper portion. Therefore, in the case where professional maintenance is conducted, the back frame 2e on the rear face of the media processor is removed so as to open the rear face of the media processor. Alternatively, the back frame 2e and the rear top frame 2d are removed so as to open the rear and the upper face of the media processor. In this state, the media drive 51 can be easily replaced, and access for such maintenance is improved. Concerning the label printer 11, the frequency of professional maintenance is the highest next to the media drive 51 because waste liquid processing is required for the label printer 11. When the back frame 2e on the rear face of the media processor is removed, it is possible to replace the waste liquid absorption tank 85.

In the media processor 1 described above, on the base frame 72 which is horizontally placed, the left side frame 2a, the right side frame 2b and the back frame 2e are vertically arranged and fixed with screws or the like. On the upper faces of the frames, the front top frame 2c and the rear top frame 2d are fixed with screws or the like. The media processor 1 further includes: a partition frame 2f for vertically partitioning the rear portion; and a partition frame 2g for longitudinally partitioning the upper portion. The partition frames 2f and 2g are preferably integrally formed. The frames can be individually attached to and detached from the media processor. The upper face, both the sides and the rear side of the processor can be individually attached and detached. The opening and closing doors 3, 4 are attached on the front face of the media processor.

Due to the above frame structure, the inside of the media processor is divided into the first division A1 in the rear upper portion, the second division A2 in the rear lower portion, the third division A3 in the front right portion and the fourth division A4 in the front left portion. In the first division A1 in the rear upper portion, the media drive 51 for writing data on the media is arranged. In the second division A2 in the rear lower portion, the label printer 11 for conducting printing on the label faces of the media is arranged. In the fourth division A4 in the front left portion, the ink supply mechanism 71 having the cartridge attaching portion 14 is arranged. In the third division A3 in the front right portion, the media storage portions 21, 22 for storing the media are arranged.

A plate-shaped frame, which covers the division in which the equipment is arranged, can be removed, and the equipment can be repaired or replaced. Since the media drive 51 and the label printer 11, for which professional maintenance is required, are arranged at the rear of the media processor, and since the ink supply mechanism 71 and the media storage portions 21, 22, on which user maintenance is conducted, are arranged in the front of the media processor, the usual user maintenance can be easily conducted from the front side of the media processor when the opening and closing doors 3, 4 are opened. Only when the less frequent professional maintenance is required, are the maintenance operations conducted from the rear side of the media processor. Accordingly, the maintenance properties of the entire media processor are improved.

A size in the width direction of the media drive 51, which is provided in the first division A1 in the rear upper portion, is smaller than that of the label printer 11. Accordingly, the electric power supply portion 55, the cooling fan 54 for radiating heat and the control board 56 are arranged on the side of the media drive 51. See FIGS. 2(A), 2(B) and 4. The media drive 51 and the electric power supply portion 55, from which heat is generated, can thus be arranged in the same division (the first division A1), and the cooling fan 54 is also arranged therein for taking countermeasures against the generated heat. Since the first division A1 is arranged in the upper portion of the media processor and air heated at high temperature is difficult to flow downward, the cooling efficiency inside of the media processor is improved. The label printer 11 in the second division A2, which is arranged at a lower position than the first division A1, is seldom affected by heat. Since the label printer 11 is provided with the ink jet head 61 which tends to be damaged by dryness, the above equipment arrangement provides a great advantage. Further, space in the media processor 1 can be effectively utilized, and the entire media processor 1 can be downsized.

An opening hole 2fb is provided in the partition frame 2f, which is an opening portion. Usually, this opening hole 2fb is closed by a cover frame 2fa which is a cover member. When the ink jet head 61, which is located in the second division A2 in the rear lower portion, is replaced, the media drive 51 and the electric power supply portion 55, which are located in the first division A1 in the rear upper portion, are removed. Then, the cover frame 2fa is detached so that the ink jet head unit 61a mounted on the carriage 62 can be exposed. Subsequently, the screw 61b is disengaged from above. In this way, the ink jet head unit 61a and the ink jet head 61 mounted on the head unit 61a can be easily replaced.

In the above embodiment, the media storage portions 21, 22 are arranged on the left in the front of the case 2, and the ink supply mechanism 71 is arranged on the right side in the front portion. However, the media storage portion 20 may be arranged on the right side in the front portion, and the ink supply mechanism 71 may be arranged on the left side in the front portion.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A media processor comprising:
   a media storage adapted to store a plate-shaped medium;
   a media drive operable to write data in the medium;
   a label printer operable to print on the medium;
   a media conveyer operable to convey the medium between the media storage, the media drive and the label printer;
   a casing defining an interior space of the media processor;
   a plate-shaped frame dividing the interior space into a first space located in a rear upper portion of the interior space, a second space located in a rear lower portion of the interior space and a front space located in a front portion of the interior space;
   a power supply unit; and
   a fan operable to take outside air into the interior space, wherein:
   the media drive is disposed in the first space;
   the label printer is disposed in the second space;
   the media storage and the media conveyer are disposed in the front space; and
   the power supply unit and the fan are disposed in the first space.

2. The media processor as set forth in claim 1, further comprising an ink supplier operable to supply ink to the label printer, wherein:
   the front space is divided into a third space and a fourth space adjacent the third space;
   the media storage and the media conveyer are disposed in the third space; and
   the ink supplier is disposed in the fourth space.

3. The media processor as set forth in claim 2, wherein the casing includes a first door for the third space and a second door for the fourth space.

4. The media processor as set forth in claim 1, wherein at least one of a rear face and an upper face of the casing is independently removable so that the first space is opened.

5. The media processor as set forth in claim 1, wherein:
   the plate-shaped frame is formed with an opening communicating between the first space and the second space; and
   the opening is closed by a cover.

6. A media processor for processing a plate-shaped medium, such processing including medium storage, data writing and label printing, the media processor comprising a casing defining an interior space of the media processor and housing media processor components for performing the processing, a power supply unit and a fan operable to take outside air into the interior space, the interior space being divided into a first professional maintenance access portion, a second professional maintenance access portion, and a user maintenance access portion, wherein the media processor components for data writing and label printing are disposed in the first professional maintenance access portion and the second professional maintenance access portion, respectively, wherein the media processing components for medium storage are disposed in the user maintenance access portion and wherein the power supply unit and the fan are disposed in the first professional maintenance access portion.

7. The media processor as set forth in claim 6, further comprising an ink supply mechanism that supplies ink to the media processor component for label printing, the ink supply mechanism being disposed in the user access maintenance portion.

* * * * *